(12) United States Patent
Andrivon et al.

(10) Patent No.: US 10,104,354 B2
(45) Date of Patent: Oct. 16, 2018

(54) METHOD AND DEVICE OF CONVERTING A HIGH-DYNAMIC-RANGE VERSION OF A PICTURE TO A STANDARD-DYNAMIC-RANGE VERSION OF SAID PICTURE

(71) Applicant: THOMSON LICENSING, Issy les Moulineaux (FR)

(72) Inventors: Pierre Andrivon, Liffre (FR); Philippe Bordes, Laille (FR); Franck Hiron, Chateaubourg (FR); Masaru Yamamoto, Kashiwa (JP); Gary Donnan, Vitre (FR); John M. Town, Ojai, CA (US)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 15/537,382

(22) PCT Filed: Dec. 9, 2015

(86) PCT No.: PCT/EP2015/079083
§ 371 (c)(1),
(2) Date: Jun. 16, 2017

(87) PCT Pub. No.: WO2016/096562
PCT Pub. Date: Jun. 23, 2016

(65) Prior Publication Data
US 2017/0366791 A1 Dec. 21, 2017

(30) Foreign Application Priority Data

Jan. 13, 2015 (EP) .................................... 15305023

(51) Int. Cl.
*H04N 7/01* (2006.01)
*H04N 11/20* (2006.01)
(Continued)

(52) U.S. Cl.
CPC ............. *H04N 9/642* (2013.01); *G06T 5/009* (2013.01); *H04N 9/646* (2013.01); *G06T 2207/20208* (2013.01)

(58) Field of Classification Search
CPC ........ H04N 9/642; H04N 9/646; H04N 19/33; H04N 19/30; H04N 19/186; H04N 19/188; G06T 5/009; G06T 2207/20208
(Continued)

(56) References Cited

U.S. PATENT DOCUMENTS

| 9,501,818 B2* | 11/2016 | Ward | G06T 5/40 |
| 2015/0245044 A1* | 8/2015 | Guo | H04N 21/42202 375/240.03 |
| 2017/0244983 A1* | 8/2017 | Atkins | H04N 19/30 |

FOREIGN PATENT DOCUMENTS

WO   WO2013046095   4/2013

OTHER PUBLICATIONS

Boyce et al., Draft High Efficiency Video Coding (HEVC) version 2, combined Format Range Extensions (RExt), Scalability (SHVC), and Multi-View (MV-HEVC) Extensions, Joint Collaborative Team on Video Coding (JCT-VC) of ISO/IEC JTC 1/SC 29/WG 11 and ITU-T SG 16 WP 3, Document JCTVC-R1013_v6, 18th Meeting, Sapporo, Japan, Jun. 30, 2014, pp. 1-541.
(Continued)

*Primary Examiner* — Trang U Tran
(74) *Attorney, Agent, or Firm* — Lily Neff (57) ABSTRACT

The present disclosure generally relates to a method and device of converting a high-dynamic-range (HDR) version of a picture to a standard-dynamic-range (SDR) version of this picture. The method is characterized in that it converts the high-dynamic-range version to the standard-dynamic-
(Continued)

range version of the picture according to: a first indicator (I1) that indicates the presence of color mapping parameters; a second indicator (I2) that indicates whether a device is configured to convert the high-dynamic-range version to the standard-dynamic-range version of the picture by taking into account said color mapping parameters; and a third indicator (I3) that indicates whether converting without taking into account said color mapping parameters is inhibited.

8 Claims, 3 Drawing Sheets

(51) Int. Cl.
*H04N 9/64* (2006.01)
*G06T 5/00* (2006.01)

(58) Field of Classification Search
USPC .............................. 348/453, 441; 375/240.03
See application file for complete search history.

(56) References Cited

OTHER PUBLICATIONS

Anonymous, "Studio encoding parameters of digital television for standard 4:3 and wide-screen 16:9 aspect ratios", International Telecommunication Union, ITU-R Radiocommunication Sector of ITU, Recommendation ITU-R BT.601-7, Mar. 2011, pp. 1-20.

Anonymous, "Parameter values for the HDTV standards for production and international programme exchange", International Telecommunication Union, ITU-R Radiocommunication Sector of ITU, Recommendation ITU-R BT.709-5, Apr. 2002, pp. 1-32.

Andrivon et al., "SEI message for Colour Mapping Information", Joint Collaborative Team on Video Coding (JCT-VC) of ISO/IEC JTC 1/SC 29/WG 11 and ITU-T SG 16 WP 3, Document JCTVC-Q0074-r3, 17th Meeting, Valencia, Spain, Mar. 27, 2014, pp. 1-14.

Luthra et al., "Draft requirements and Use Cases for HDR and WCG Content Distribution", International Organisation for Standardisation, ISO/IEC JTC1/SC29/WG11, Coding of Moving Pictures and Audio, Document MPEG2014/N14547, Sapporo, Japan, Jul. 2014, pp. 1-12.

\* cited by examiner

| SyntaxSyntax | No. of bits | Semantics |
|---|---|---|
| AppInfoPlayList() { | | |
| length | 32 | |
| reserved_for_future_use | 8 | |
| PlayList_playback_type | 8 | |
| ... | | |
| lossless_may_bypass_mixer_flag | 1 | |
| MVC_Base_view_R_flag | 1 | |
| HDR_SDR_coupling_type | 2 | Indicates how HDR and SDR video streams are packaged<br>01b: PlayList without HDR-SDR coupling<br>10b: One of HDR-SDR coupled PlayLists, provided on the same disc<br>11b: One of HDR-SDR coupled PlayLists, provided on the coupled discs |
| SDR_conversion_notification_flag | 1 | Indicates if notification of HDR->SDR conversion is to be provided by HDMV/BD-J program. If not, the player may show notification (e.g., "This content will be played back as SDR pictures due to display capability. It might be different from content provider's intension.") before HDR->SDR conversion |
| SDR_conversion_type | 2 | 00b: indicates that no CRI present on the disk and the player can perform HDR to SDR conversion using its own algorithm<br>10b: indicates that no CRI present on the disk and the player is inhibited to perform HDR to SDR conversion<br>01b: indicates that CRI are present on the disk |
| reserved_for_future_use | 7 | |
| } | | |

Fig. 4

| SyntaxSyntax | No. of bits | Semantics |
|---|---|---|
| AppInfoPlayList() { | | |
| length | 32 | |
| reserved_for_future_use | 8 | |
| PlayList_playback_type | 8 | |
| .. | | |
| lossless_may_bypass_mixer_flag | 1 | |
| MVC_Base_view_R_flag | 1 | |
| HDR_SDR_coupling_type | 2 | Indicates how HDR and SDR video streams are packaged<br>01b: PlayList without HDR-SDR coupling<br>10b: One of HDR-SDR coupled PlayLists, provided on the same disc<br>11b: One of HDR-SDR coupled PlayLists, provided on the coupled discs |
| SDR_conversion_notification_flag | 1 | Indicates if notification of HDR->SDR conversion is to be provided by HDMV/BD-J program. If not, the player may show notification (e.g., "This content will be played back as SDR pictures due to display capability. It might be different from content provider's intension.") before HDR->SDR conversion |
| CRI_present_flag | 1 | Indicate if CRI metadata are present on the disc or not. |
| SDR_conversion_inhibition_flag | 1 | Indicate whether or not converting without taking into account CRI |
| reserved_for_future_use | 7 | |
| } | | |

Fig. 5

METHOD AND DEVICE OF CONVERTING A HIGH-DYNAMIC-RANGE VERSION OF A PICTURE TO A STANDARD-DYNAMIC-RANGE VERSION OF SAID PICTURE

This application claims the benefit, under 35 U.S.C. § 365 of International Application PCT/EP2015/079083, filed Dec. 9, 2015, which was published in accordance with PCT Article 21(2) on Jun. 23, 2016, in English, and which claims the benefit of European Application No. 15305023.2 filed Jan. 13, 2015 and European Application No. 14290388.9 filed Dec. 16, 2014.

FIELD

The present disclosure generally relates to picture/video converting. Particularly, but not exclusively, the technical field of the present disclosure is related to converting of an picture whose pixels values belong to a high-dynamic range.

BACKGROUND

The present section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In the following, a picture contains one or several arrays of samples (pixel values) in a specific picture/video format which specifies all information relative to the pixel values of a picture (or a video) and all information which may be used by a display and/or any other device to visualize and/or decode a picture (or video) for example. A picture comprises at least one component, in the shape of a first array of samples, usually a luma (or luminance) component, and, possibly, at least one other component, in the shape of at least one other array of samples, usually a color component. Or, equivalently, the same information may also be represented by a set of arrays of color samples, such as the traditional tri-chromatic RGB representation.

A pixel value is represented by a vector of n values, where n is the number of components. Each value of a vector is represented with a number of bits which defines a maximal dynamic range of the pixel values.

Standard-Dynamic-Range pictures (SDR pictures) are pictures whose luminance values are represented with a limited number of bits (most often 8 or 10). This limited representation does not allow correct rendering of small signal variations, in particular in dark and bright luminance ranges. In high-dynamic range pictures (HDR pictures), the signal representation is extended in order to maintain a high accuracy of the signal over its entire range. In HDR pictures, pixel values are usually represented in floating-point format (either 32-bit or 16-bit for each component, namely float or half-float), the most popular format being openEXR half-float format (16-bit per RGB component, i.e. 48 bits per pixel) or in integers with a long representation, typically at least 16 bits.

A color gamut is a certain complete set of colors. The most common usage refers to a set of colors which can be accurately represented in a given circumstance, such as within a given color space or by a certain output device.

A color volume is defined by a color space and a dynamic range of the values represented in said color space.

For example, a color volume is defined by a RGB ITU-R Recommendation BT.2020 color space and the values represented in said RGB color space belong to a dynamic range from 0 to 4000 nits (candela per square meter). Another example of color volume is defined by a RGB BT.2020 color space and the values represented in said RGB color space belong to a dynamic range from 0 to 1000 nits.

Color-grading a picture (or a video) is a process of altering/enhancing the colors of the picture (or the video). Usually, color-grading a picture involves a change of the color volume (color space and/or dynamic range) or a change of the color gamut relative to this picture. Thus, two different color-graded versions of a same picture are versions of this picture whose values are represented in different color volumes (or color gamut) or versions of the picture whose at least one of their colors has been altered/enhanced according to different color grades. This may involve user interactions.

For example, in cinematographic production, a picture and a video are captured using tri-chromatic cameras into RGB color values composed of 3 components (Red, Green and Blue). The RGB color values depend on the tri-chromatic characteristics (color primaries) of the sensor. A first color-graded version of the captured picture is then obtained in order to get theatrical renders (using a specific theatrical grade). Typically, the values of the first color-graded version of the captured picture are represented according to a standardized YUV format such as BT.2020 which defines parameter values for Ultra-High Definition Television systems (UHDTV).

Then, a Colorist, usually in conjunction with a Director of Photography, performs a control on the color values of the first color-graded version of the captured picture by fine-tuning/tweaking some color values in order to instill an artistic intent.

A second color-graded version of the captured picture is also obtained to get home release renders (using specific home, Blu-Ray Disk/DVD grade). Typically, the values of the second color-graded version of the captured picture are represented according to a standardized YUV format such as ITU-R Recommendation BT.601 (Rec. 601) which defines studio encoding parameters of Standard Digital Television for standard 4:3 and wide-screen 16:9 aspect ratios, or ITU-R Recommendation BT.709 which defines parameter values for High Definition Television systems (HDTV).

Obtaining such a second color-graded version of the captured picture usually comprises stretching the color volume of the first color-graded version of the captured picture (for example RGB BT.2020 1000 nits modified by the Colorist) in order that the second color-graded version of the captured picture belong to a second color volume (RGB BT.709 1000 nits for example). This is an automatic step which uses a default color mapping function (for example for mapping of RGB BT.2020 format to RGB BT.709) usually approximated by a three dimensional look-up-table (also called 3D LUT). Note that all the considered YUV formats are characterized with the Color primaries parameters that allow defining any RGB-to-YUV and YUV-to-RGB color mappings.

Then, a Colorist, usually in conjunction with a Director of Photography, performs a control on the color values of the second color-graded version of the captured picture by fine-tuning/tweaking some color values in order to instill the artistic intent in the home release.

It is known to explicitly signal a default color mapping to a display, such as the YUV-to-RGB color mapping, so that the display is able to apply the appropriate default color mapping. Moreover, when the color mapping uses color mapping parameters calculated from a first and second color-graded version of a picture, it is known that those color mapping parameters are also signaled to the display so that the display is able to apply the appropriate default color mapping with appropriate color mapping parameters.

Using a default color mapping fails to preserve the artist intent because some colors, as specified by the colorist, in the first or second color-graded version of a picture may not be preserved when the default color mapping is applied on the first color-graded version of the picture.

For example, memory color such as flesh or skin tones, blue sky or green grass shades . . . etc, should be preserved when specified by the colorist for a given grade.

A typical use case is as follows: One has bought a new movie on a UHD HDR WCG Blu-ray disk ( ). Moreover, he is equipped in home with a UHD Blu-Ray player adapted to decode a HDR version burnt on said Blu-Ray disc. However, when the Blu-Ray player is connected to a legacy TV set that does not have HDR capability (but that may be 4K UHD and or WCG enabled as a DVB UHD-1 phase 1 compliant CE device). It means that such a Blu-Ray player has to convert the HDR version of the movie to a SDR version e.g. HDTV video signal for the legacy TV set. This conversion is said "blind" as the Blu-Ray player converts the HDR version of the movie without any knowledge of the "true" targeted movie look (e.g. current Blu-ray disc HD grade). Indeed, artistic intent (non-deterministic processing) may diverge according to the creative intent of the artist/colorist/Director of Photography and the available palette of picture alteration. Consequently, the resulting SDR version of the movie does not preserved the artist intent.

The present disclosure has been devised with the foregoing in mind.

SUMMARY

In light of the foregoing, aspects of the present disclosure are directed to creating and maintaining semantic relationships between data objects on a computer system. The following presents a simplified summary of the disclosure in order to provide a basic understanding of some aspects of the disclosure. This summary is not an extensive overview of the disclosure. It is not intended to identify key or critical elements of the disclosure. The following summary merely presents some aspects of the disclosure in a simplified form as a prelude to the more detailed description provided below.

The disclosure sets out to remedy at least one of the drawbacks of the prior art with a method of converting a HDR version of a picture to a SDR version of this picture. The method is characterized in that it converts the HDR version to the SDR version of the picture according to:
 a first indicator that indicates the presence of color mapping parameters;
 a second indicator that indicates whether a device is configured to convert the HDR version to the SDR version of the picture by taking into account said color mapping parameters; and
 a third indicator that indicates whether converting without taking into account said color mapping parameters is inhibited.

Thus, typically, a UHD WCG HDR Blu-Ray disc comprising a referenced version (i.e. UHD HDR WCG version) of a movie and color mapping parameters (e.g. parameters allowing to remap the HDR WCG content to creative intent preserved SDR Rec. 709 content for a legacy TV set connected to a HDR Blu-Ray player), may further comprise the first indicator that indicates the presence on the Blu-Ray disk of color mapping parameters used for converting the HDR version to the SDR version of the movie. The Blu-Ray player may then convert the HDR version burnt on the disk according to its capabilities (indicated by the second indicator) and according to the value of said first indicator in order to obtain a SDR version of the movie that preserves the artist intent. The third indicator ensures that a SDR version of the HDR version of the movie cannot be obtained by a method that does not preserve the artist intent (blind or non-referenced method).

According to other of its aspects, the disclosure relates to a device comprising a processor configured to implement the above method, a computer program product comprising program code instructions to execute the steps of the above method when this program is executed on a computer, a processor readable medium having stored therein instructions for causing a processor to perform at least the steps of the above method, and a non-transitory storage medium.

The specific nature of the disclosure as well as other objects, advantages, features and uses of the disclosure will become evident from the following description of embodiments taken in conjunction with the accompanying drawings.

BRIEF DESCRIPTION OF DRAWINGS

In the drawings, an embodiment of the present disclosure is illustrated. It shows:
FIG. 5 shows an embodiment of the method.
 Similar or same elements are referenced with the same reference numbers.

DESCRIPTION OF EMBODIMENTS

The present disclosure will be described more fully hereinafter with reference to the accompanying figures, in which embodiments of the disclosure are shown. This disclosure may, however, be embodied in many alternate forms and should not be construed as limited to the embodiments set forth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Although some of the diagrams include arrows on communication paths to show a primary direction of communication, it is to be understood that communication may occur in the opposite direction to the depicted arrows.

Some embodiments are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "one embodiment" or "an embodiment" means that a particular feature, structure, or characteristic described in connection with the embodiment can be included in at least one implementation of the disclosure. The appearances of the phrase "in one embodiment" or "according to an embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

While not explicitly described, the present embodiments and variants may be employed in any combination or sub-combination.

The disclosure is described for converting a picture but extends to the converting of a sequence of pictures (video) because each picture of the sequence is sequentially encoded/decoded as described below.

It is well-known in the art that color mapping parameters are obtained by estimating a color mapping between two color-graded versions of a same picture, i.e. estimating a color mapping function that optimally maps the color values of the first color-graded version of the picture onto the color values of the second color-graded version of said picture. A Least mean squares approach may be used to obtain the optimal mapping.

Figure 1:
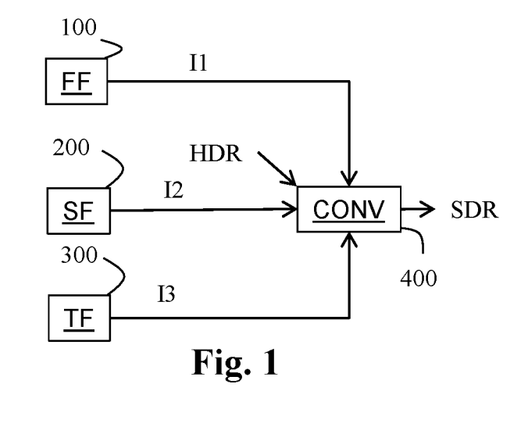
FIG. 1 shows a block diagram of the steps of a method of converting a HDR version of a picture to a SDR version of this picture in accordance with an embodiment of the disclosure.

FIG. 1 shows a block diagram of the steps of a method of converting a HDR version of a picture to a SDR version of this picture in accordance with prior art.

In step 100, a module FF obtains a first indicator I1 that indicates or identifies the presence of color mapping parameters used for converting the HDR version to the SDR version of the picture.

In step 200, a module SF obtains a second indicator I2 that indicates whether a device is configured to convert the HDR version to the SDR version of the picture by taking into account said color mapping parameters.

In step 300, a module TF obtains a third indicator I3 that indicates if converting without taking into account said color mapping parameters is inhibited.

In step 400, a module CONV converts the HDR version of the picture to the SDR version of said picture according to said third, second and third indicators.

According to an embodiment, the first, second and/or third indicator is obtained from a disc or a local memory or a remote memory via a communication network.

According to an embodiment, the second indicator I2 is a flag F2 (one bit).

The value of the flag F2 equals a first value (v(F2)=1) to indicate that a device is configured to convert the HDR version to the SDR version of the picture by taking into account said color mapping parameters.

The value of the flag F2 equals a second value (v(F2)=0) to indicate that a device is not configured to convert the HDR version to the SDR version of the picture by taking into account said color mapping parameters.

According to an embodiment, a single indicator SI represents the first and the third indicators.

The value of the single indicator SI equals a first value (v(SI)=1) to indicate the presence of color mapping parameters.

The value of the single indicator SI equals a second value (v(SI)=0) or third value (v(SI)=2) to indicate that color mapping parameters are not present.

According to an embodiment, whether the value of the single indicator SI equals the second value (v(SI)=0) then the device is allowed to convert the HDR version to the SDR version of the picture without taking into account said color mapping parameters. Whether the value of the single indicator SI equals the third value (v(SI)=2) then the device is not allowed to convert the HDR version to the SDR version of the picture without taking into account said color mapping parameters. Whether the value of the single indicator SI equals the first value (v(SI)=1) to indicate the presence of color mapping parameters and the value of the flag F2 equals the first value (v(F2)=1) then the HDR version is converted to the SDR version of the picture by taking into account said color mapping parameters. Whether the value of the single indicator SI equals the first value (v(SI)=1) to indicate the presence of color mapping parameters and the value of the flag F2 equals the second value (v(F2)=0) then converting the HDR version to the SDR version of the picture is inhibited.

According to an embodiment, the first indicator I1 is represented by a first flag F1 and the third indicator I3 is represented by a third flag F3.

The value of the flag F1 equals a first value (v(F1)=1) to indicate the presence of color mapping parameters. The value of the flag F1 equals a second value (v(F1)=0) to indicate that color mapping parameters are not present. The value of the flag F3 equals a first value (v(F3)=1) then the device is not allowed to convert the HDR version to the SDR version of the picture without taking into account said color mapping parameters. The value of the flag F3 equals a second value (v(F3)=0) then the device is allowed to convert the HDR version to the SDR version of the picture without taking into account said color mapping parameters.

According to an embodiment, when v(F3)=0 the HDR version may be converted to the SDR version of the picture by taking into account said color mapping parameters when v(F1)=v(F2)=1 and else without taking into account said color mapping parameters. When v(F3)=1 the HDR version may be converted to the SDR version of the picture by taking into account said color mapping parameters when v(F1)=v(F2)=1 and else the HDR version is not converted to the SDR version of the picture.

On FIG. 1, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the disclosure are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 2:
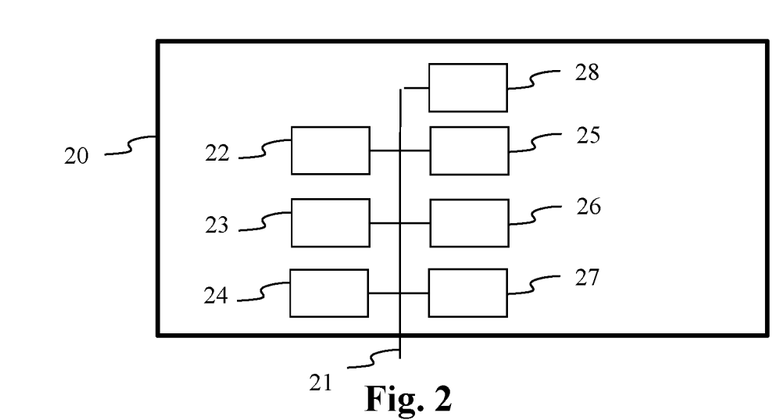
FIG. 2 represents an exemplary architecture of a device which is configured to implement a method described in relation with FIG. 1.

FIG. 2 represents an exemplary architecture of a device 20 which is configured to implement a method described in relation with FIG. 1.

Device 20 comprises following elements that are linked together by a data and address bus 21:
 a processor 22 (or CPU), which is, for example, a DSP (or Digital Signal Processor);
 a ROM (or Read Only Memory) 23;
 a RAM (or Random Access Memory) 24;
 an I/O interface 25 for reception of data to transmit, from an application;
 a battery 26;
 a communication interface 27 and
 an optical disk reader 28.

According to a variant, the battery 26 is external to the device. Each of these elements of FIG. 2 are well-known by those skilled in the art and won't be disclosed further. In each of mentioned memory, the word «register» used in the specification can correspond to area of small capacity (some bits) or to very large area (e.g. a whole program or large amount of received or decoded data). ROM 23 comprises at least a program and parameters. Algorithm of the methods according to the disclosure is stored in the ROM 23. When switched on, the CPU 22 uploads the program in the RAM and executes the corresponding instructions.

RAM 24 comprises, in a register, the program executed by the CPU 22 and uploaded after switch on of the device 20, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in a processor which refers to processing devices in general, including, for example, a Blu-Ray player, a computer, a microprocessor, an integrated circuit, or a programmable logic device. Processors also include communication devices, such as, for example, computers, cell phones, portable/personal digital assistants ("PDAs"), and other devices such that facilitate communication of information between end-users.

According to a specific embodiment of the device, the first, second and/or third indicator is obtained from a source. For example, the source belongs to a set comprising:
 a local memory (23 or 24), e.g. a video memory or a RAM (or Random Access Memory), a flash memory, a ROM (or Read Only Memory), a hard disk;
 a storage interface (25), e.g. an interface with a mass storage, a RAM, a flash memory, a ROM, an optical disc or a magnetic support;
 a communication interface (27), e.g. a wireline interface (for example a bus interface, a wide area network interface, a local area network interface) or a wireless interface (such as a IEEE 802.11 interface or a Bluetooth® interface);
 a non-transitory storage medium such a Blu-Ray Disk; and
 a picture capturing circuit (e.g. a sensor such as, for example, a CCD (or Charge-Coupled Device) or CMOS (or Complementary Metal-Oxide-Semiconductor).

According to different embodiments, device 20 being configured to implement the method described in relation with FIG. 1, belongs to a set comprising:
 a mobile device;
 a communication device;
 a game device;
 a tablet (or tablet computer);
 a laptop;
 a still picture camera;
 a video camera;
 an encoding chip;
 a still picture server;
 a Blu-Ray player; and
 a video server (e.g. a broadcast server, a video-on-demand server or a web server).

Figure 3:
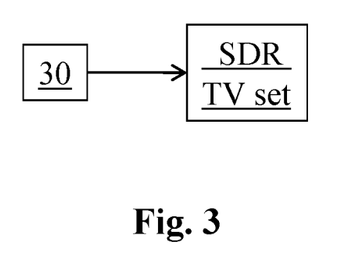
FIG. 3 shows schematically a system of displaying a SDR version of a picture from a HDR version of said picture in accordance with an embodiment of the disclosure.

FIG. 3 shows schematically a system of displaying a SDR version of a picture from a HDR version of said picture.

The system comprises a device 20 connected to a legacy TV set via an HDMI bus for example.

According to an embodiment, the optical disk reader 38 of the device 20 obtains the first and/or third indicators from a Blu-Ray disk, and the device further obtains the second indicator from a local memory 23 for example.

The processor 22 of the device 20 is then configured to implement a method as described in relation with FIG. 1.

According to an embodiment, the non-transitory storage medium is a Blu-Ray disk i.e a disk that conforms, for example, to a Blu-Ray specification.

Figure 4:
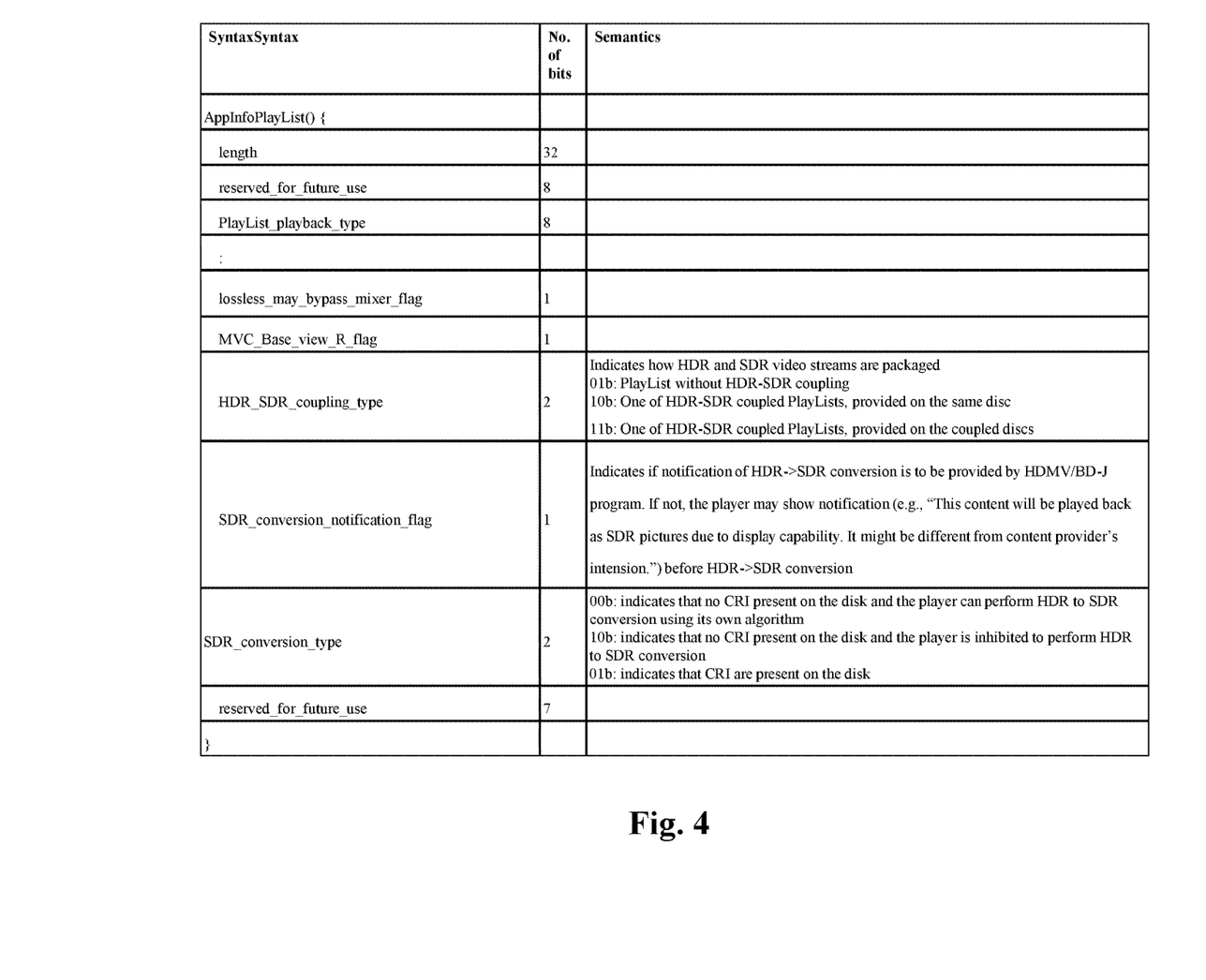
FIG. 4 shows an embodiment of the method.

According to an embodiment of the method, illustrated in FIG. 4, the single indicator SI is added to a playlist attributes AppInfoPlayList of the Blu-Ray specification. Such a single indicator may be a syntax element called SDR_conversion_type.

Figure 5:
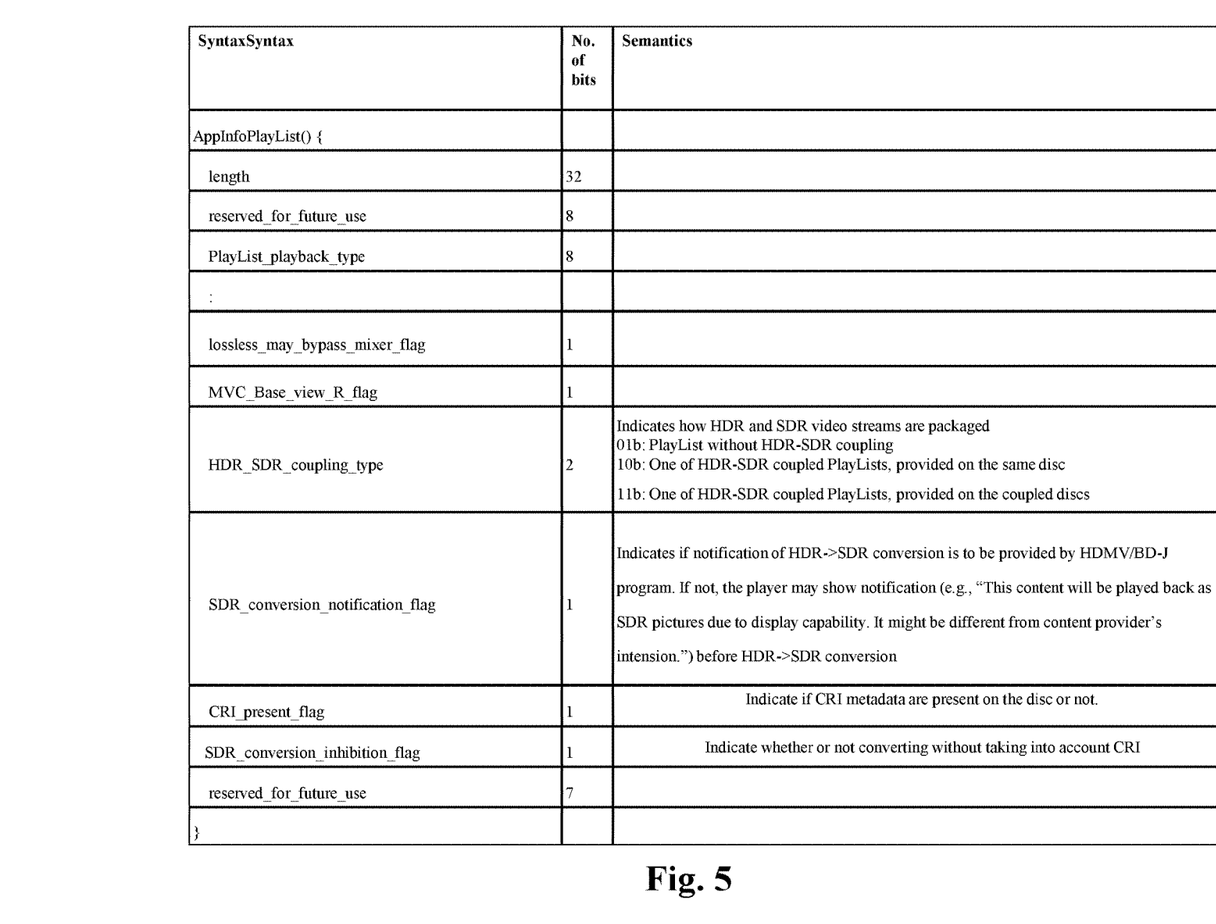

According to a variant, illustrated in FIG. 5, the first flag F1 is added to a playlist attributes AppInfoPlayList of the Blu-Ray specification. Such a flag F1 may be a syntax element called CRI_present_flag. The third flag F3 is added to said playlist attributes AppInfoPlayList. Such a flag F3 may be a syntax element called SDR_conversion_inhibition_flag.

According to an embodiment, when the device 20 is a Blu-Ray device, a second flag F2 is added to the Player Status Register the Blu-Ray specification. Such a second flag F2 may be a syntax element called for example CRI_decoder_present flag (or CRI_capability(_flag) or CRI_enabling(_flag)).

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a picture or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of converting a HDR version of a picture to a SDR version of this picture, comprising:
   obtaining a first information data that indicates the presence of color mapping parameters;
   obtaining a second information data that indicates whether a device is configured to convert the HDR version to the SDR version of the picture by taking into account said color mapping parameters;
   obtaining a third information data that indicates whether converting the HDR version of the picture to the SDR version of this picture without taking into account said color mapping parameters is inhibited; and
   converting the HDR version of a picture according to the obtained information data.

2. The method of claim 1, wherein the first, second and/or third information data is obtained from a disk or a local memory or a remote memory via a communication network.

3. The method of claim 1, wherein a single information data (SI) represents the first and the third information data.

4. A device for converting a HDR version of a picture to a SDR version of this picture, comprising:
   a processor configured to:
      obtain a first information data that indicates the presence of color mapping parameters;
      obtain a second information data that indicates whether a device is configured to convert the HDR version to the SDR version of the picture by taking into account said color mapping parameters;
      obtain a third information data that indicates whether converting without taking into account said color mapping parameters is inhibited; and
      convert the HDR version of a picture according to the obtained information data;
   and memory for storing a program.

5. The device of claim 4, wherein it further comprises an optical disk reader used to obtain, from a disk, at least one of said information data.

6. A computer program product having a non-transitory computer readable medium comprising program code instructions to execute the method according to claim 1 when this program is executed on a computer.

7. A processor readable non-transitory computer medium having stored therein instructions for causing said processor to perform at least the method according to claim 1.

8. A System for displaying a SDR version of a picture from a HDR version of said picture comprising the device of converting a HDR version of a picture to a SDR version of this picture according to claim 4 and a SDR display connected to said device.

\* \* \* \* \*